United States Patent Office 3,096,370
Patented July 2, 1963

3,096,370
REACTIONS OF BORON HALIDES AND TETRA-SUBSTITUTED BORON COMPOUNDS
Murray Bloom and Robert M. Washburn, Whittier, Calif., assignors to American Potash & Chemical Corporation, a corporation of Delaware
No Drawing. Filed Mar. 30, 1959, Ser. No. 802,602
12 Claims. (Cl. 260—543)

This invention relates in general to the preparation of triarylboranes, diarylhaloboranes, and aryldihaloboranes by the reaction of a tetraarylborohydride and a boron trihalide.

It is an object of this invention to provide a process for the preparation of triarylboranes, diarylhaloboranes, and aryldihaloboranes by a reaction involving a boron halide as one reactant.

It is still another object of this invention to provide a method for recovering triarylboranes, diarylhaloboranes, or arylidihaloboranes from mixtures of tetraarylborohydrides and triarylboranes.

It is yet another object of this invention to provide a method for isolating triarylboranes, diarylhaloboranes and aryldihalobranes, individually or in admixture, from mixtures containing one or more of these materials plus tetraarylborohydrides by a process which makes possible the conversion of the tetraarylborohydrides into more of the desired borane and eliminates any necessity for fractionation or similar conventional separation procedures.

It is a further object of this invention to provide a new process for preparing triarylboranes, diarylhaloboranes, and aryldihaloboranes by the reaction of a tetraarylborohydride and a boron trihalide.

Ancillary objects and advantages of this invention, if not specifically set forth, will become apparent during the course of the description which follows.

Broadly, it has been found that triarylboranes, diarylhaloboranes and aryldihaloboranes may be produced by reacting a tetraarylborohydride of the general formula

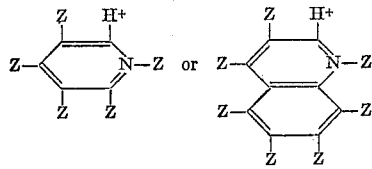

with a boron trihalide. In the formula, Z may be H, halogen, lower alkyl, lower alkoxy, acetamide, or dialkylamino, and C+ may be a group I or group II metal or complex metal ion such as MgBr+ (any Mg-halogen complex is satisfactory), or lower alkyl-substituted ammonium cation such as $(CH_3)_4N^+$, or a substituted or fused-ring pyridinium cation, such as

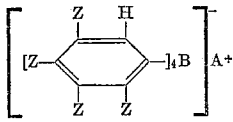

where Z is defined above. Compounds of this class are also referred to variously in the literature as "tetraarylborons," "tetraarylborates" and "tetraarylborides."

The general reaction outlined above is important because mixtures of triarylborane and tetraarylborohydride are generally formed by the reaction of various arylating agents and boron halides even when the desired product is the aryldihaloborane. Since tetraarylborohydrides react with boron halides to yield triarylboranes, diarylhaloboranes and aryldihaloboranes, and the triarylboranes in turn react with boron halides to form diarylhaloboranes and aryldihaloboranes, it is possible to recover the boron-carbon bond values of the mixture produced by the reaction of an arylating agent and a boron halide by subsequent treatment with additional boron halide. The major product formed by this treatment of such a mixture will, of course, depend on the amount of boron halide used and the nature of the aryl groups involved. For example, a reaction between boron trifluoride and phenylmagnesium bromide yields a mixture of phenyldifluoroborane, triphenylborane and magnesiumbromotetraphenylborohydride. If one treats this product mixture with boron trifluoride, one can obtain phenyldifluoroborane from the triphenylborane and sodium tetraphenylborohydride and at no time short of the termination of the final reaction is the separation of the reactants or products necessary.

As indicated in the general formula above, one or more of the hydrogens bonded to the aromatic nucleus of the tetraaryl compound may be replaced in an o, m or p-position. However, it is generally believed that as a result of steric interference, tetraarylborohydrides will not form where both ortho positions are substituted. This does not in any way limit the usefulness of the new reactions disclosed herein since the more unstable the tetraarylborohydride is the more facile is the reaction with a boron trihalide.

The product or products obtained from the reaction of a tetraarylborohydride and a boron trihalide depend to a great extent upon the ratio of reactants. For example, the following equations show that the general reaction of a tetraaryloborohydride and a boron trihalide can be made to yield a product consisting predominantly of the desired arylborane:

$$3NaB(C_6H_5)_4 + BX_3 \rightarrow 4(C_6H_5)_3B + 3NaX \quad (1)$$

$$NaB(C_6H_5)_4 + BX_3 \rightarrow 2(C_6H_5)_2BX + NaX \quad (2)$$

$$NaB(C_6H_5)_4 + 3BX_3 \rightarrow 4C_6H_5BX_2 + NaX \quad (3)$$

Various examples are set forth below for illustrative purposes, but these are not to be interpreted as imposing limitations on the scope of the invention other than as set forth in the appended claims.

EXAMPLE 1

Preparation of Phenyldibromoborane 9.3 g. of sodium tetraphenylborohydride was treated with 20 ml. of boron tribromide. After the vigorous exothermic reaction had abated, the mixture was refluxed for seventeen hours. Distillation gave unreacted boron tribromide and 14.3 g. of phenyldibromoborane $(b_4\ 72-B_{2.5}\ 110)$ whose analysis indicated a yield of 80% based on the unrecovered boron tribromide, or 54% based on the sodium tetraphenylborohydride.

EXAMPLE 2

Preparation of Phenyldichloroborane 75.5 g. of boron trichloride was condensed onto 8.9 g. of sodium tetraphenylborohydride contained in a bomb tube cooled to liquid nitrogen temperature. The tube was sealed and heated at 57° for fifteen hours. The tube was cooled, opened, and the contents filtered. The analysis of the filtrate (5.62% B, the ratio of boron carbon bonds to boron atoms was 0.91:1, and 40.0% Cl) indicated the presence of phenyldichloroborane.

EXAMPLE 3

Preparation of Phenyldichloroborane 11.8 g. of sodium tetraphenylborohydride were placed in a flash equipped with a Dry Ice condenser and about 100 ml. of boron trichloride was distilled in. The mixture was refluxed for eight hours and the excess boron trichloride was allowed to evaporate. After the addition of 50 ml. of Skelly F to the residue, it was filtered and the precipitate was washed with 50 ml. of Skelly F. in three portions. The combined filtrate and washings were distilled and 5.4 g. of phenyldichloroborane $b_{10}$ was obtained.

EXAMPLE 4

*Preparation of Phenyldifluoroborane*

6.0 g. of sodium tetraphenylborohydride was treated with a solution of 16.5 g. of boron trifluoride in 23.5 g. of ether. Distillation gave a mixture of phenyldifluoroborane and boron trifluoride etherate, $b$ 80–124, whose analysis indicated the presence of a 44% yield of phenyldifluoroborane based on the sodium tetraphenylborohydride.

EXAMPLE 5

*Preparation of Phenyldibromoborane*

4.4 g. of potassium tetraphenylborohydride was treated with 10 ml. of boron tribromide and after the vigorous exothermic reaction had subsided, the mixture was heated in a 100° bath for twenty hours. Distillation gave 6.4 g. of phenyldibromoborane, $b_{2.7}$ 61–$b_{1.5}$ 61. This corresponds to a 69% yield based on the unrecovered boron tribromide, or 56% based on the potassium tetraphenylborohydride.

EXAMPLE 6

*Preparation of p-Tolyldibromoborane*

A mixture of 4.3 g. (11 mmoles) of sodium tetra-p-tolylborohydride and 10 ml. of boron tribromide was heated under reflux of fifteen hours. Distillation of the reaction mixture gave three fractions:

(1) 4.80 g. of p-tolyldibromoborane, $b_{10}$ 98–110, m. 39–41° C.

*Analysis.*—Calcd. for $C_7H_7BBr_2$: Br, 60.3; B, 4.07. Found Br, 61.6; B, 4.13%.

(2) $b_{10}$ 110–114° C., 0.7 g., and
(3) $b_{10}$ 114–134° C., 0.4 g.

reaction mixture gave 1.75 g. of a colorless liquid $b_{3.5}$ 82–$B_{3.0}$ 73° C., which solidified on cooling. The identity of the product was proved to be p-chlorophenyldibromoborane by hydrolysis and dehydration to the corresponding anhydride, m. 271–9° C.

*Analysis.*—Calcd. for $C_{18}H_{12}B_3Cl_3O_3$: C, 52.1; H, 2.91; B, 7.82; Cl, 25.6%. Found: C, 52.7; H, 2.79; B, 7.84; Cl, 25.5%.

A second fraction $b_{3.0}$ 155° C. crystallized in the condenser and weighed 1.58 g. It was identified as di-p-chlorophenylbromoborane by hydrolysis to the corresponding acid followed by dehydration to di-p-chlorobenzeborinic anhydride.

*Analysis.*—Calcd. for $C_{24}H_{16}B_2Cl_2O$: C, 59.57; H, 3.40; B, 4.53; Cl, 27.6%. Found: C, 59.57; H, 3.33; B, 4.47; Cl, 29.31%.

EXAMPLE 8

*Preparation of Triphenylborane*

A solution of boron trifluoride in ether was added to sodium tetraphenylborohydride. The mixture was heated to 35° and then cooled to room temperature. After fifteen minutes, long colorless needles of triphenylborane were formed in the supernatant liquid.

As indicated, the common nucleus consisting of four phenyl (substituted or unsubstituted) groups and associated boron atoms of the tetraarylborohydride determines the outcome of the specific reactions disclosed herein. Since the tetraarylboron anion determines the function of the tetraarylborohydride, it may be stated that any tetraarylborohydride which may be prepared is capable of reacting with any of the boron halides to yield the desired product. Hence, the reaction may be generalized upon to an extent far beyond that indicated in the examples above, the only limitation being with respect to the tetraarylborohydrides which are obtainable. The table below outlines additional reactions which may be carried out in the fashion of the reactions described in the detailed examples above.

| Tetraarylborohydride | | | Boron Halide | Moles | Primary Boron-Containing Product |
|---|---|---|---|---|---|
| Cation | Anion | Moles | | | |
| Na+ | (p-C$_3$H$_7$—C$_6$H$_4$)$_4$B− | 1 | BCl$_3$ | 3 | p-C$_3$H$_7$—C$_6$H$_4$BCl$_2$ |
| Na+ | [p-(CH$_3$)$_2$N—C$_6$H$_4$]$_4$B− | 3 | BBr$_3$ | 1 | [p-(CH$_3$)$_2$N—C$_6$H$_4$]$_3$B |
| (CH$_3$)$_4$N+ | (C$_6$H$_5$)$_4$B− | 1 | BBr$_3$ | 3 | C$_6$H$_5$BBr$_2$ |
| Ca++ | (C$_6$H$_5$)$_4$B− | 1 | BBr$_3$ | 3 | C$_6$H$_5$BBr$_2$ |
| Sr++ | (C$_6$H$_5$)$_4$B− | 3 | BBr$_3$ | 1 | (C$_6$H$_5$)$_2$BBr |
| Ba++ | (C$_6$H$_5$)$_4$B− | 3 | BBr$_3$ | 1 | (C$_6$H$_5$)$_3$B |
| MgBr+ | (C$_6$H$_5$)$_4$B− | 3 | BCl$_3$ | 1 | (C$_6$H$_5$)$_3$B |
| MgBr+ | (C$_6$H$_5$)$_4$B− | 1 | BF$_3$ | 3 | C$_6$H$_5$BF$_2$ |
| Li+ | (C$_6$H$_5$)$_4$B− | 3 | BF$_3$ | 1 | (C$_6$H$_5$)$_3$B |
| Rb+ | (3,4,5,6-Cl$_4$—C$_6$H)$_4$B− | 1 | BCl$_3$ | 3 | 3,4,5,6-Cl$_4$—C$_6$HBCl$_2$ |
| Os+ | (C$_6$H$_5$)$_4$B− | 1 | BBr$_3$ | 3 | C$_6$H$_5$BBr$_2$ |
| C$_5$H$_5$NH+ | (CH$_3$O—C$_6$H$_4$)$_4$B− | 3 | BBr$_3$ | 1 | (CH$_3$OC$_6$H$_4$)$_2$BBr |
| CH$_3$—C$_5$H$_4$NH+ | (C$_6$H$_5$)$_4$B− | 1 | BBr$_3$ | 3 | C$_6$H$_5$BBr$_2$ |
| (CH$_3$)$_2$C$_5$H$_3$N+ | (C$_6$H$_5$)$_4$B− | 3 | BCl$_3$ | 1 | (C$_6$H$_5$)$_2$BCl |
| C$_4$H$_4$C$_5$H$_3$N+ | (C$_6$H$_5$)$_4$B− | 1 | BF$_3$ | 3 | C$_6$H$_5$BF$_2$ |
| Na+ | (C$_2$H$_5$O—C$_6$H$_4$)$_4$B− | 3 | BF$_3$ | 1 | (C$_2$H$_5$OC$_6$H$_4$)$_3$B |
| K+ | (p-CH$_3$COHN—C$_6$H$_4$)$_4$B− | 1 | BI$_3$ | 3 | p-CH$_3$COHN—C$_6$H$_4$BI$_2$ |
| Na+ | (p-Br—C$_6$H$_4$)$_4$B− | 1 | BF$_3$ | 3 | Br—C$_6$H$_4$BF$_2$ |
| Hg++ | (m-Cl—C$_6$H$_4$)$_4$B− | 3 | BF$_3$ | 1 | (Cl—C$_6$H$_4$)$_3$B |
| Ag+ | (p-F—C$_6$H$_4$)$_4$B− | 1 | BBr$_3$ | 1 | (F—C$_6$H$_4$)$_2$BBr |
| | (C$_6$H$_5$)$_4$B− | 1 | BBr$_3$ | 3 | C$_6$H$_5$BBr$_2$ |
| Na+ | [3,4,5-(CH$_3$)$_3$—C$_6$H$_2$]$_4$B− | 1 | BI$_3$ | 3 | 3,4,5-(CH$_3$)$_3$C$_6$H$_2$BI$_2$ |
| C$_6$H$_5$NCH$_3$+ | (p-CH$_3$C$_6$H$_4$)$_4$B− | 1 | BBr$_3$ | 1 | (p-CH$_3$C$_6$H$_4$)$_2$BBr |

Fraction 3 was shown to be largely p-tolyldibromoborane by hydrolysis and dehydration to the corresponding anhydride. Thus, the yield of p-tolyldibromoborane was 70% based on the sodium p-tolylborohydride.

EXAMPLE 7

*Preparation of p-Chlorophenyldibromoborane and Di-p-Chlorophenylbromoborane*

A mixture of 7.3 moles of potassium tetra-6-chlorophenylborohydride and 10 ml. of boron tribromide was heated under reflux for fifteen hours. Distillation of the The reaction of a boron trihalide with a tetraarylborohydride is often exothermic and is preferably carried out under conditions such that the heat generated can be conveyed off and thereby afford control of the reaction. However, under certain circumstances, as in Examples 6 and 7 above, the reaction may not proceed of its own accord even at room temperature and gentle heating or refluxing may be necessary. The optimum conditions for the reaction of any two given reagents may readily be ascertained by contacting one with the other at room temperature or lower and, where no reaction ensues, the mixture may be warmed in the reaction vessel.

Although the reaction is conveniently carried out without a solvent, solvents which are inert to the boron trihalide undergoing reaction may be used. Ethers are good solvents for boron trifluoride, but should not be used with other boron trihalides since they undergo reaction to give undesirable side products. Solvents which can be used are benzene, toluene, hexane, carbon tetrachloride and nitrobenzene.

Most of the reactions proceeds at atmospheric pressure, but in certain circumstances it is convenient to use pressure, as in the reactions involving boron trifluoride and boron trichloride.

The preparation of the tetraarylborohydrides is well understood. Sodium tetraphenylborohydride is available commercially at this writing and Wittig and co-workers have prepared many other tetraarylborohydrides, any of which will work in the process of this invention. See the following articles for information with respect to the preparation of the tetraarylborohydrides:

G. Wittig and P. Raff, U.S. Pat. 2,853,525 (1958).
G. Wittig, Angew. Chem. 62A, 231 (1950).
G. Wittig and W. Hertwig, Ber. 88, 962 (1955).
G. Wittig and G. Keicher, Naturwissenschaften 34, 216, (1947).
G. Wittig, G. Keicher, A. Ruckert and P. Raff, Ann. 563, 110 (1949).
G. Wittig and G. Lehman, Ber. 90, 875 (1957).
G. Wittig and H. Ludwig, Ann. 589, 55 (1954).
G. Witting and P. Raff, Ann. 573, 195 (1951).
G. Wittig and A. Ruckert, Ann. 566, 101 (1950).

While, as stated above, any tetraarylborohydride which can be prepared will react in the process of this invention, the tetraarylborohydrides which incorporate, as the cation thereof, nitrogen-containing radicals are not the most important materials from the standpoint of the process disclosed herein. Where nitrogen-containing bases are used, there will be a certain amount of reaction between the boron trihalide and the nitrogen base as exemplified by the following equation:

(CH₃)₃NH⁺B(C₆H₅)₄⁻ + 2BF₃ ⟶
(C₆H₅)₃B + (C₆H₅)BF₂ + (CH₃)₃NH⁺BF

Hence, the process of this invention is best carried out utilizing metal tetraarylborohydrides and boron halides.

The triaryl boron compounds form stable coordination compounds with ammonia, which coordination compounds may be used as a lube oil additive. See U.S. Patent 2,234,581.

The diarylhaloboranes may readily be converted via hydrolysis and subsequent dehydration to arylborinic anhydrides, which may be used as analytical reagents for flavones. Note, for example, R. Neu, Chemist-Analyst 47, 106 (1958).

The aryldihaloboranes are easily hydrolyzed to the corresponding boronic acids or solvolyzed with an alcohol to the corresponding boronic ester. The boronic acids, esters, etc. are well-known compounds having various uses. Hence all of the materials which are prepared according to the process of this invention are known compounds having recognized utilities.

Obviously, many modifications and variations of this invention may be made without departing from the spirit and scope thereof and only such limitations should be imposed as are indicated in the appended claims.

We claim:
1. The process for the preparation of aryldihaloboranes, diarylhaloboranes and triarylboranes, comprising reacting a boron trihalide with a tetraarylborohydride of the general formula

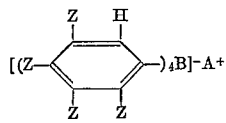

where each Z is selected from the class consisting of H, halogen, lower alkyl, lower alkoxy, acetamido and dimethylamino and A is a cation selected from the class consisting of Mg-halogen, Na+, K+, Rb+, Cs+, Ag+, Ca++, Sr++, Ba++, Hg+, lower alkyl-substituted ammonium groups, substituted pyridinium groups of the general formula

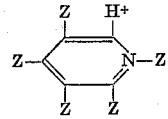

where Z is as defined above and fused ring pyridinium groups of the general formula

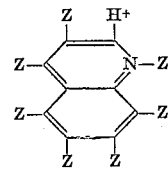

where Z is as defined above.

2. The process of claim 1 wherein the tetraarylborohydride is sodium tetraphenylborohydride.

3. The process of claim 1 wherein the tetraarylborohydride is potassium tetra-p-chlorophenylborohydride.

4. The process of claim 1 wherein the ratio of tetraarylborohydride to boron halide is adjusted to about 1:3, whereby to encourage the formation of triarylboranes.

5. The process of claim 1 wherein the ratio of tetraarylborohydride to boron halide is adjusted to about 1:1, whereby to encourage the formation of diarylhaloboranes.

6. The process of claim 1 wherein the ratio of tetraarylborohydride to boron halide is adjusted to about 3:1 whereby to encourage the formation of triarylboranes.

7. A process for the preparation of phenyldibromoborane comprising reacting sodium tetraphenylborohydride with boron tribromide in about a 1:3 molar ratio.

8. A process for the preparation of phenyldichloroborane comprising reacting boron trichloride with sodium tetraphenylborohydride in about a 1:3 molar ratio.

9. A process for the preparation of phenyldifluoroborane comprising reacting boron trifluoride with sodium tetraphenylborohydride in about a 1:3 molar ratio.

10. The process for the preparation of di-p-chlorophenylbromoborane comprising reacting boron tribromide with potassium tetra-p-chlorophenylborohydride in about a 1:1 molar ratio.

11. The process for the preparation of triphenylborane comprising reacting boron trifluoride with sodium tetraphenylborohydride in about a 3:1 molar ratio.

12. The process for the preparation of aryldihaloboranes, diarylhaloboranes and triarylboranes comprising reacting a boron trihalide with a tetraarylborohydride of the general formula

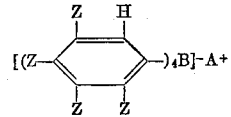

where each Z is selected from the class consisting of H, halogen, lower alkyl, lower alkoxy, acetamido and dimethylamino and A is a cation selected from the class consisting of Mg-halogen, Na+, K+, Rb+, Cs+, Ag+, Ca++, Sr++, Ba++, Hg+, lower alkyl-substituted ammonium groups, substituted pyridinium groups of the general formula

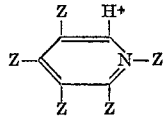

where Z is as defined above and fused ring pyridinium groups of the general formula

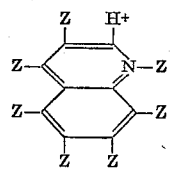

where Z is as defined above, said tetraarylborohydride having in admixture therewith at least one member of the class consisting of an aryldihaloborane, diarylhaloborane and a triarylhaloborane.

References Cited in the file of this patent

Buls et al.: J.A.C.S., vol. 79, pages 337–339 (1957).
Gerrard et al.: Chem. Rev., vol. 58, pp. 1081–1111 (1958).